(12) United States Patent
Laubscher

(10) Patent No.: US 9,239,224 B2
(45) Date of Patent: Jan. 19, 2016

(54) NATURAL LIGHT INTERFEROMETER

(71) Applicant: Bryan Edward Laubscher, Olympia, WA (US)

(72) Inventor: Bryan Edward Laubscher, Olympia, WA (US)

(*) Notice: Subject to any disclaimer, the term of this patent is extended or adjusted under 35 U.S.C. 154(b) by 0 days.

(21) Appl. No.: 13/815,387

(22) Filed: Feb. 26, 2013

(65) Prior Publication Data

US 2014/0240715 A1    Aug. 28, 2014

(51) Int. Cl.
*G01B 9/02* (2006.01)

(52) U.S. Cl.
CPC .................. *G01B 9/02044* (2013.01)

(58) Field of Classification Search
CPC ........... G01B 2290/10; G01B 2290/45; G01B 2290/70; G01B 9/02002; G01B 9/02091; G01J 9/02; G01N 21/4795
USPC .................................................. 356/484, 450
See application file for complete search history.

(56) References Cited

U.S. PATENT DOCUMENTS

| | | |
|---|---|---|
| 5,875,030 A | 2/1999 | Cooke et al. |
| 6,111,644 A * | 8/2000 | Ballard .......................... 356/454 |
| 7,271,418 B2 | 9/2007 | Shi et al. |

* cited by examiner

*Primary Examiner* — Tri T Ton

(57) ABSTRACT

Disclosed is a Natural Light Interferometer. The interferometer measures the amplitude and phase distribution of a coherent or incoherent electromagnetic signal, including natural light. In principle, the amplitude and phase distribution of any signal of any wavelength, incoherent or coherent, may be measured using this technique. The corresponding image may be reconstructed as well. The interferometer exploits Fourier transform heterodyne techniques but extends this technology to incoherent signals. The interferometer generates the analyzing signal by exploiting nanotechnology-based signal generation stimulated by the original signal. The Natural Light Interferometer applications include surveillance and reconnaissance; metrology; space-based free-flying, tethered or rigid interferometer arrays; and ground-based sparse interferometer arrays. There is also disclosed a homodyne embodiment of the Natural Light Interferometer that exploits quadrature phase techniques.

20 Claims, 7 Drawing Sheets

NATURAL LIGHT INTERFEROMETER

BACKGROUND OF THE INVENTION

1. Field of the Invention

The present invention relates to an interferometer that measures the amphat of a coherent or incoherent EM signal, including natural light. In principle, the amphat of any signal of any wavelength, incoherent or coherent, may be measured using this technique. In this way, the amphat of the signal may be stored and analyzed. The corresponding image may be reconstructed as well.

2. Description of the Prior Art

U.S. Pat. No. 5,875,030 describes a Method and Apparatus for Coherent Electromagnetic Field Imaging Through Fourier Transform Heterodyne. From the abstract: Apparatus and method for imaging objects through the inverse transformation of a set of Fourier coefficients measured by a detector. The Fourier coefficients are generated by heterodyning the electromagnetic field reflected from an object, with a reference electromagnetic field that has had the transverse phase modulated with a Fourier basis set. Doppler imaging of objects is accomplished through temporal frequency filtering of the Fourier coefficients at a plurality of heterodyne intermediate frequencies.

Fourier Transform Heterodyne (FTH) technology operates on coherent or quasi-coherent light only. As a coherent technique, it utilizes a laser or local oscillator as the second, coherent beam. Incoherent signals, including natural light signals, cannot be analyzed by FTH technology.

U.S. Pat. No. 7,271,418 B2 describes a Semiconductor Apparatus for White Light Generation and Amplification. From the abstract: The present invention is a semiconductor apparatus for white light generation and amplification, where, under different current bias, white light can be generated steadily and evenly by folding up multi-wavelength quantum wells and by side-injecting a current. And, the white light can be excited out electronically without mingling with a fluorescent powder so that the cost for sealing is reduced. Because the light is directly excited out by electricity to prevent from energy loss during fluorescence transformation, the light generation efficiency of the present invention is far greater than that of the traditional phosphorus mingled with light-emitting diode of white light. Besides, concerning the characteristics of the white light, the spectrum of the white light can be achieved by adjusting the structure and/or the number of the quantum wells while preventing from being limited by the atomic emission lines of the fluorescent powder.

The patent in the preceding paragraph does not include using the generated EM signal as a homodyne analyzing signal of an interferometer using quadrature phase analysis.

The publication, Energy-transfer pumping of semiconductor nanocrystals using an epitaxial quantum well, Achermann, M., et al, Nature, Vol 429, pg 642, describes light generation that is shifted from the stimulating radiation. From the abstract: As a result of quantum-confinement effects, the emission colour of semiconductor nanocrystals can be modified dramatically by simply changing their size[1,2]. Such spectral tunability, together with large photoluminescence quantum yields and high photostability, make nanocrystals attractive for use in a variety of light-emitting technologies—for example, displays, fluorescence tagging[3], solid-state lighting and lasers[4]. An important limitation for such applications, however, is the difficulty of achieving electrical pumping, largely due to the presence of an insulating organic capping layer on the nanocrystals. Here, we describe an approach for indirect injection of electron-hole pairs (the electron-hole radiative recombination gives rise to light emission) into nanocrystals by non-contact, non-radiative energy transfer from a proximal quantum well that can in principle be pumped either electrically or optically. Our theoretical and experimental results indicate that this transfer is fast enough to compete with electron-hole recombination in the quantum well, and results in greater than 50 percent energy transfer efficiencies in the tested structures. Furthermore, the measured energy-transfer rates are sufficiently large to provide pumping in the stimulated emission regime, indicating the feasibility of nanocrystal-based optical amplifiers and lasers based on this approach.

The publication in the preceding paragraph does not include using the wavelength-shifted, generated EM signal as the analyzing signal of an interferometer.

The publication, Hybrid silicon evanescent wave laser fabricated with a silicon waveguide and III-V offset quantum wells, Hyundai, P., et al, OPTICS EXPRESS, Vol. 13, No. 23, discusses evanescent wave stimulation of quantum wells. From the abstract: A novel laser that utilizes a silicon waveguide bonded to AlGaInAs quantum wells is demonstrated. This wafer scale fabrication approach allows the optical waveguide to be defined by CMOS-compatible silicon processing while optical gain is provided by III-V materials. The AlGaInAs quantum well structure is bonded to the silicon wafer using low temperature oxygen plasma-assisted wafer bonding. The optically pumped 1538 nm laser has a pulsed threshold of 30 mW and an output power of 1.4 mW.

The publication in the preceding paragraph does not include using the radiation from the quantum wells as an analyzing signal of an interferometer.

SUMMARY OF THE INVENTION

The present invention is an interferometer that operates on coherent or incoherent EM signals, including natural light. A natight signal is analyzed by a sequence of genight signals, each having an amphat corresponding to one base of a complete orthonormal basis set. The analyzing genight signal is generated from the natight, using nanotechnology techniques as a facsimile of the natight that carries the same frequency distribution albeit slightly frequency-shifted by a constant value. The natight is mixed with each genight, one after another, in a single element square-law detector. The complex IF signal from the detector output carries in its amphat the information to construct the coefficient of the base to which the genight's amphat corresponds. In this way, the natight's amphat can be measured and reconstructed in a computer by calculating each term of the basis set and summing all the terms. There is also a homodyne version of the interferometer that exploits quadrature phase techniques.

DETAILED DESCRIPTION OF THE INVENTION

1. Definitions

Figure 1:
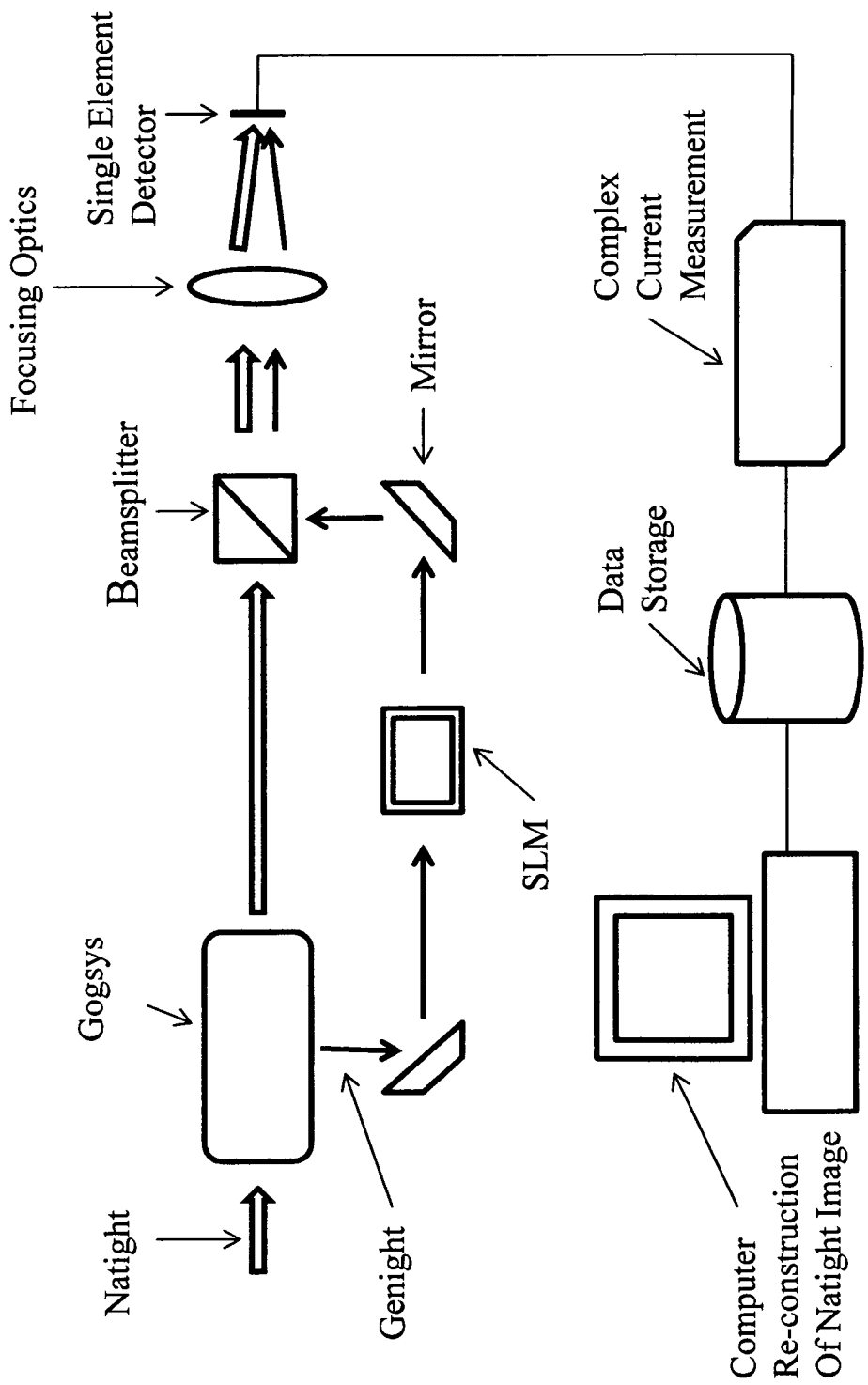
FIG. 1 illustrates schematically the best mode of the Natural Light Interferometer according to the present invention.

Amphat—When used herein shall mean the amplitude and phase distribution of an EM wave or waves. Amphat is an EM wave's amplitude and phase pattern.

EM—When used herein shall mean electromagnetic.

Freesat—When used herein shall mean a free-flying satellite that is part of the observational array of a space-based interferometer.

Genight—When used herein shall mean a generated, facsimile EM signal, slightly frequency-shifted from the original signal by a constant value, created by a system composed of multiple quantum wells and nanocrystals, or other technologies, that are stimulated by a proximate natight.

Gogsys—When used herein shall mean a system that exploits nanotechnology such as MQW, NCs and/or waveguides, or other technologies, to generate a facsimile EM signal, slightly frequency-shifted from the original signal by a constant value. This signal is a genight.

Hogsys—When used herein shall mean a device that exploits nanotechnology such as MQW, NCs and/or waveguides, or other technologies, to generate a facsimile EM signal, that is not frequency-shifted from the original signal by a constant value. This signal is a homight.

Homight—When used herein shall mean a generated, facsimile EM signal, not frequency-shifted from the original signal, created by a system composed of MQW, or other technologies, that are stimulated by a proximate natight.

IF—When used herein shall mean intermediate frequency, the beat frequency generated by the interference of two signals of different frequency.

Mastsat—When used herein shall mean a master timing satellite part of a space-based interferometer.

MQW—When used herein shall mean multiple quantum wells. These quantum wells may be identical or a distribution of different wells or a mixture of both.

Natight—When used herein shall mean a coherent or incoherent EM signal, including a natural light signal.

NC—When used herein shall mean nanocrystal.

NLI—When used herein shall mean the present invention, a Natural Light Interferometer.

SLM—When used herein shall mean a spatial light modulator capable of impressing phase information onto an EM signal. In the present invention, an SLM is used to impress a phase pattern, called a spatpat, onto a genight or homight.

Spatpat—When used herein shall mean a phase pattern produced by a phase modulation device such as an SLM. In the present invention, an SLM generates a spatpat that is impressed on a genight or homight to analyze the amphat of the natight.

VLBI—When used herein shall mean very long baseline interferometry. This ground-based radio astronomy technique involves taking simultaneous measurements of astronomical objects from radio telescopes distributed across Earth's surface. Atomic clocks at each observatory time tag the measurements that exploit radio-frequency techniques and thereby record both the amplitude and phase of the observed signal. Later, the measurements from the far-flung observatories are brought together in a computer, aligned in time, and using exact observatory location information, the individual measurements are interfered in pairs, on a computer, to produce images of resolution that correspond to an aperture of the distance between the telescopes. In some cases, the distances between the observatories are thousands of miles!

2. Best Mode of the Invention

FIG. 1 illustrates the best mode contemplated by the Inventor of the Natural Light Interferometer.

3. How to Make the Invention

As can be amply seen in FIG. 1, a natight enters the Natural Light Interferometer by first traversing the gogsys.

Figure 2:
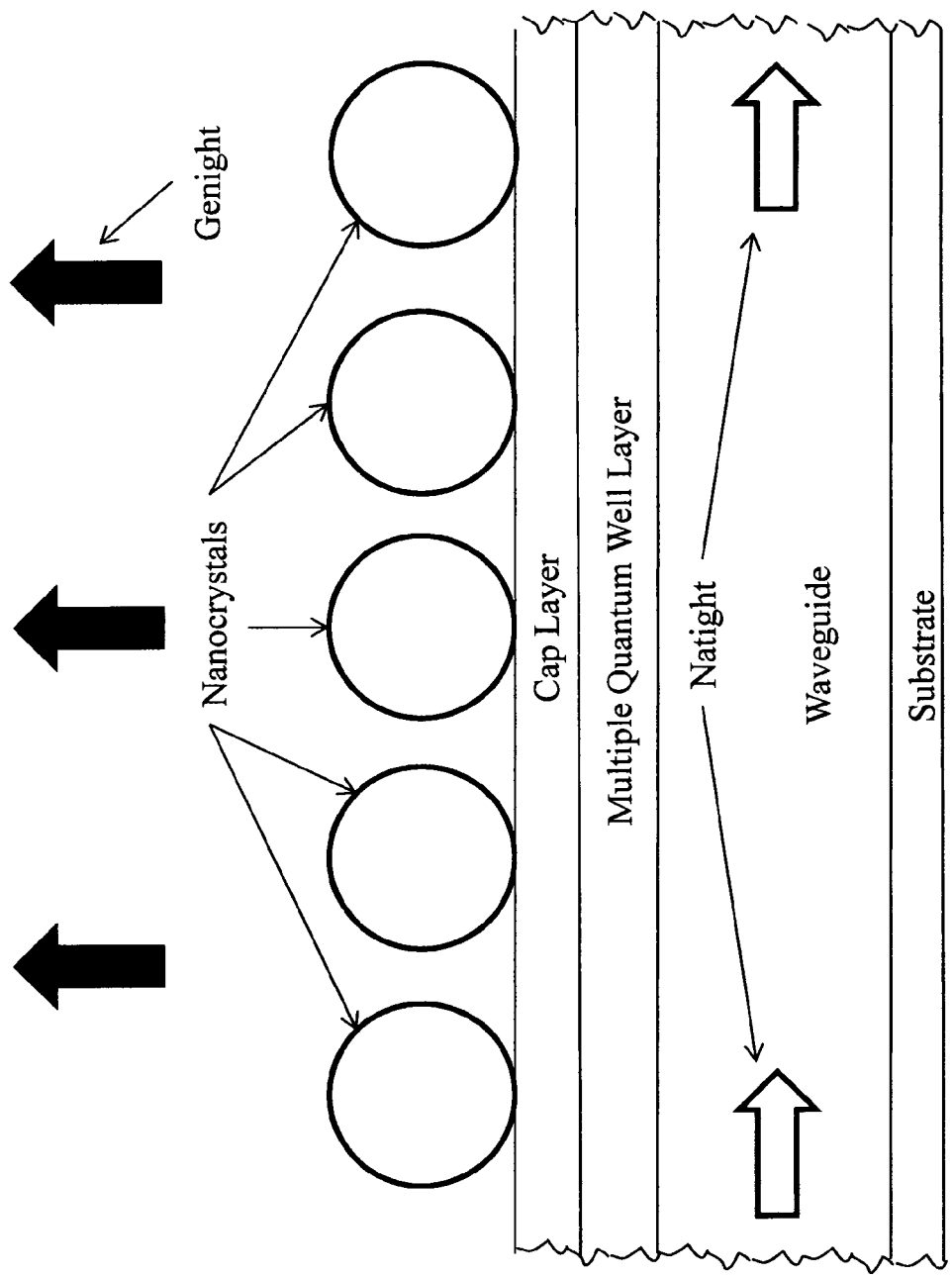
FIG. 2 illustrates a notional, schematic, detail of the gogsys according to the present invention.

As seen in FIG. 2, inside the gogsys the natight excites the MQW layer proximate to the waveguide (in which the natight travels) by electric field stimulation (evanescent wave). There is no charge flow across the interface between the waveguide and MQW layer. The MQW are constructed as a distribution of types so the spectrum of the natight is preserved. Second, a Forster-like non-radiative energy transfer occurs from the MQW to the NCs. The NCs are constructed with a size distribution that emits a slightly frequency-shifted facsimile signal perpendicular to the input signal direction, a genight. The genight is a reproduction of the frequency profile (although the entire profile is slightly frequency-shifted) of the natight but lacks its phase information.

Back to FIG. 1, the genight reflects off a turning mirror and enters an SLM. The SLM impresses a spatpat onto the genight. Ideally, the genight should be a plane wave before encountering the SLM. Therefore, a spatial filter may be used to filter out extraneous phase structure in the genight. This spatpat is one base of a complete orthonormal basis set that will be used to analyze the natight amphat.

The genight continues to another turning mirror and then into a beamsplitter. At this point the natight and genight are combined. These two signals are aligned in space and time. This may require a delay in the natight path before the beamsplitter.

The natight and genight signals are focused onto a single element, square law detector. The detector outputs a complex current oscillating at the IF between the natight and genight signals. The amplitude and phase of this complex current correspond to the coefficients of the projection of the genight amphat onto the natight amphat. In this way, by impressing, in a serial fashion, a complete orthonormal set of analyzing spatpats onto plane wave genight signals, the natight amphat is measured. Operationally, the SLM pattern is changed from one analyzing spatpat to the next, pausing in its cadence for at least one measurement of the detector complex amplitude and phase to be accomplished. Each of the corresponding measurements gives the complex coefficients of that particular natight's amphat projection onto the genight's amphat.

For example, the SLM could impress onto the plane wave genight, one by one, amphats that represent the first thirty-six Zernike polynomials. One by one, each of the genight's impressed amphats are mixed with the natight's amphat in the detector. The complex current from the detector is measured for each mixing. After all thirty-six corresponding complex current's amplitude and phase are measured, the coefficients of the Zernike terms can be calculated. The sum of these thirty-six terms yields the natight's amplitude and phase distribution. The natight image can be obtained by taking the magnitude of the amplitude and phase data. The efficacy of the reconstruction will depend on the number of Zernike polynomials measured. This is in exact analogy with Fourier transform heterodyne that operates only with coherent signals.

Back to FIG. 1, the phase and magnitude of the detector complex current is measured, stored and later used to reconstruct the natight amphat and/or image on a computer.

Figure 3:
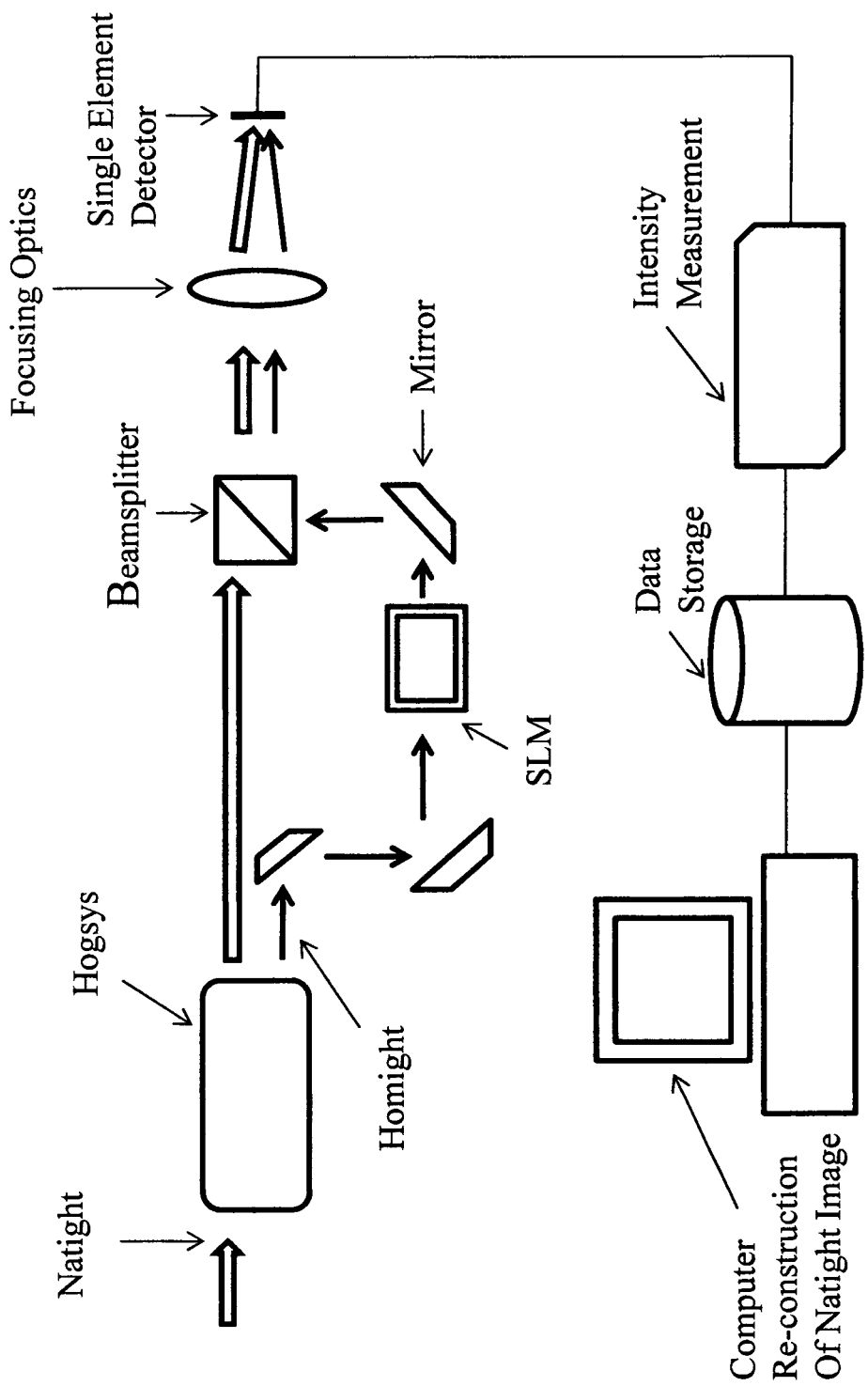
FIG. 3 illustrates schematically the homodyne embodiment of the NLI according to the present invention.

Another embodiment of the NLI involves homodyne signals. This embodiment exploits quadrature phase techniques to extract amplitude and phase information from intensity measurements of the single element detector. To accomplish this, the measurement of each coefficient of the basis set requires two intensity measurements. The first measurement involves the amphat impressed onto the homight; the second measurement is made with the quadrature phase version of the amphat impressed onto the homight. One of the ramifications of this homodyne embodiment is that the number of measurements required for a complete analysis is doubled from the heterodyne embodiment. FIG. 3 illustrates the homodyne embodiment. The natight enters homodyne embodiment of the Natural Light Interferometer by first traversing the hogsys.

Figure 4:
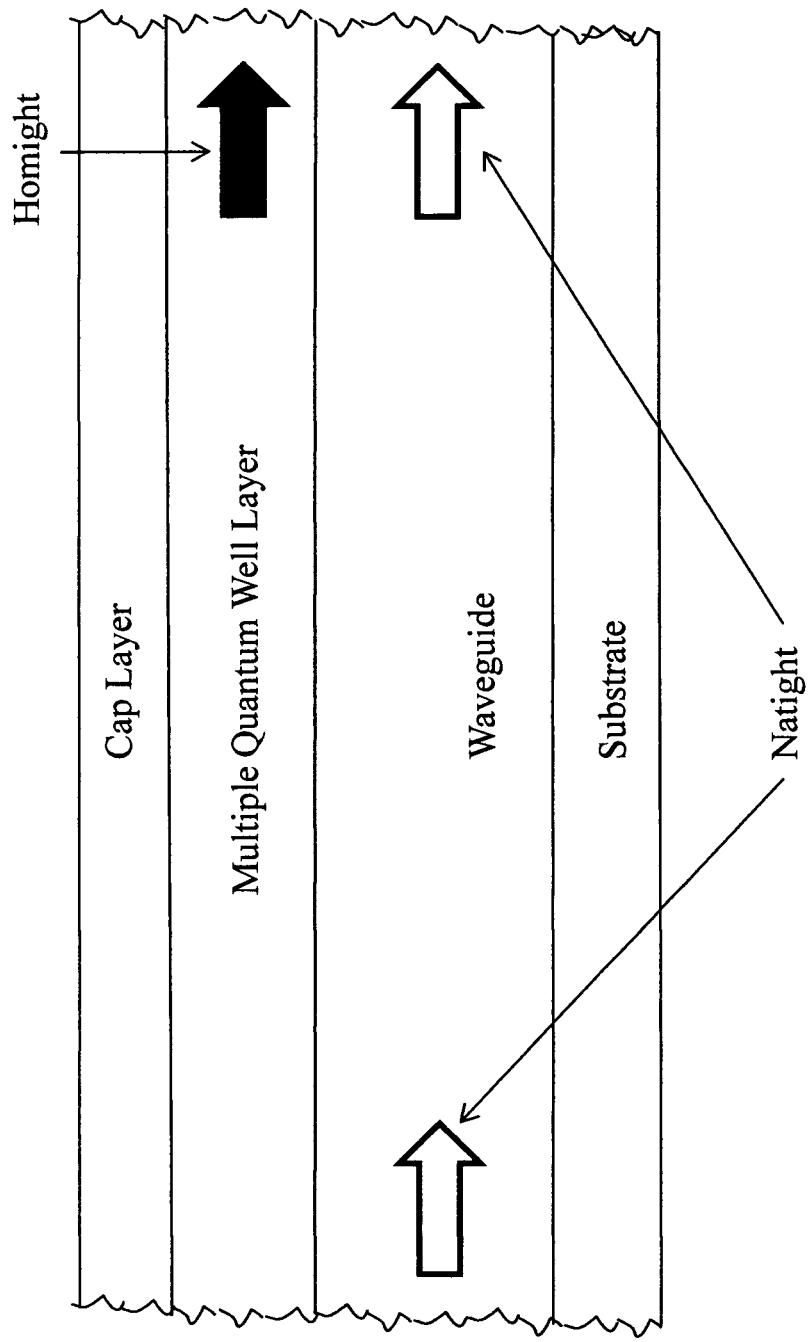
FIG. 4 illustrates a notional, schematic, detail of the hogsys of the homodyne embodiment of the NLI according to the present invention.

As seen in FIG. 4, inside the hogsys the natight stimulates the MQW layer proximate to the waveguide. There is no charge flow across the interface between the waveguide and MQW layer. The MQW generate a frequency facsimile signal (homight) by electric field stimulation (evanescent wave). The MQW are constructed as a distribution of types so the spectrum of the natight is preserved. The homight reproduces the frequency profile of the natight but not its phase information.

Back to FIG. 3, the homight reflects off a turning mirror and enters an SLM. The SLM impresses a spatpat onto the homight. Ideally, the homight should be a plane wave before encountering the SLM. Therefore, a spatial filter may be used to filter out extraneous phase structure in the homight. The homight's impressed amphat is one of a basis set that will be used to analyze the natight amphat.

The homight continues to another turning mirror and then into a beamsplitter. At this point the natight and homight are combined. These two signals are aligned in space and time. This may require a delay in the natight beam path before the beamsplitter.

The natight and homight signals are focused onto a single element, square law detector. The detector outputs an intensity measurement. The coefficient of the particular basis vector represented by the amphat is determined by this intensity measurement and the intensity measurement resulting from the quadrature phase amphat. In this way, by impressing, in a serial fashion, a complete orthonormal set of amphats, and the corresponding quadrature phase amphats, onto homight signals, the natight amphat is measured. Operationally, the SLM pattern is changed from one analyzing amphat to the next, pausing in its cadence for at least one measurement of the detector intensity to be accomplished. Each of the corresponding measurements gives the complex coefficients of that particular amphat's projection onto the homight's amphat.

For example, the SLM could impress onto the plane wave homight, one by one, spatpats that represent the first thirty-six Zernike polynomials and the thirty-six quadrature phase Zernike polynomials, for a total of seventy-two homight amphats. After measurement of each of the seventy-two corresponding intensities, each pair of amphat and its quadrature amphat corresponding to the coefficient of one Zernike polynomial, the natight's amphat may be reconstructed in a computer. The efficacy of the reconstruction will depend on the number of Zernike polynomials measured.

Back to FIG. 3, the intensity is measured, stored and later used to reconstruct the natight amphat and/or image on a computer.

In the gogsys structure, it is possible to have the natight waveguide be the MQW layer instead of proximate to it. In the hogsys case, however, it would be difficult to separate out the natight and the generated homight.

Optical amplifiers based upon any technology, including MQW technology can, in principle, be used to boost any of the signals; natight, genight and/or homight.

The NLI is capable of detecting phase changes of much less than a wavelength. In a metrology application, a phase ambiguity occurs when the distance change being measured by the NLI exceeds a wavelength. Operating the NLI with multiple IFs created by generating multiple genights with multiple gogsyses, wherein the corresponding frequencies (and hence IFs) are slightly different from each other, extends the distance change being measured by the NLI before phase ambiguity occurs. Prudent choices of the IF difference(s) can extend the distance change before phase ambiguity sets in to hundreds or even thousands of wavelengths. The multiple genight signal generators may also be constructed as part of one large, all inclusive gogsys. In one embodiment, each genight has a separate signal path from the other genights and is mixed with a portion of the natight in its own detector, with its own current measurement. Alternatively, each genight may share the same signal path and the different IFs are separated out by spectral analysis of the detector current. Yet another possibility is that each shares the same signal path and the signals are separated out by path length and timing; thereby extending the distance change before phase ambiguity occurs.

4. Examples

The NLI is useful whenever the measurement of an EM signal amphat or image is important. Of particular importance is that the NLI can measure coherent and incoherent EM signals, including natural light.

As an example of one possible embodiment, a surveillance and/or reconnaissance system in which the efficient transmission of images is necessary to reduce transmission bandwidth or power, could exploit the NLI. Images or image information could be transmitted by sending only the coefficients of the basis set. This reduces image data to only a few numbers! In this way, a massive image can be reduced to 36 numbers! How few numbers depends upon the number of basis vectors required for image quality.

Metrology is an area where the NLI can be of use. The ability to measure distance changes to within a fraction of a wavelength is of great value, especially in electronics manufacturing and nanotechnology. In this application, the NLI would passively analyze the EM signal from a surface. As either or both the mechanical actuation of a machine or the process of manipulating a surface are carried out, the NLI continually measures the signal from the surface documenting the evolution of the surface. Indeed, an NLI system could be a part of the control loop of such processes. The analysis of the evolution of the coefficients, amphat or image can be used to interpret or guide the building of electronic or nanotechnology structures.

To minimize the information required to describe an image to the absolute minimum, one or a few special spatpats may be used. If the imaging system is looking for a certain pattern, one or a few spatpats, representing that pattern, can be impressed on a genight or homight (when the quadrature phase version of the amphat is also measured) and mixed in the detector with the natight, to determine if the pattern is present in the natight. This matched filter capability could be used to transmit a data signal from the system only when the pattern is detected. Indeed, in the extreme case, the on-board computer analysis transmits a "yes" signal to indicate that the pattern has been detected.

Figure 5:
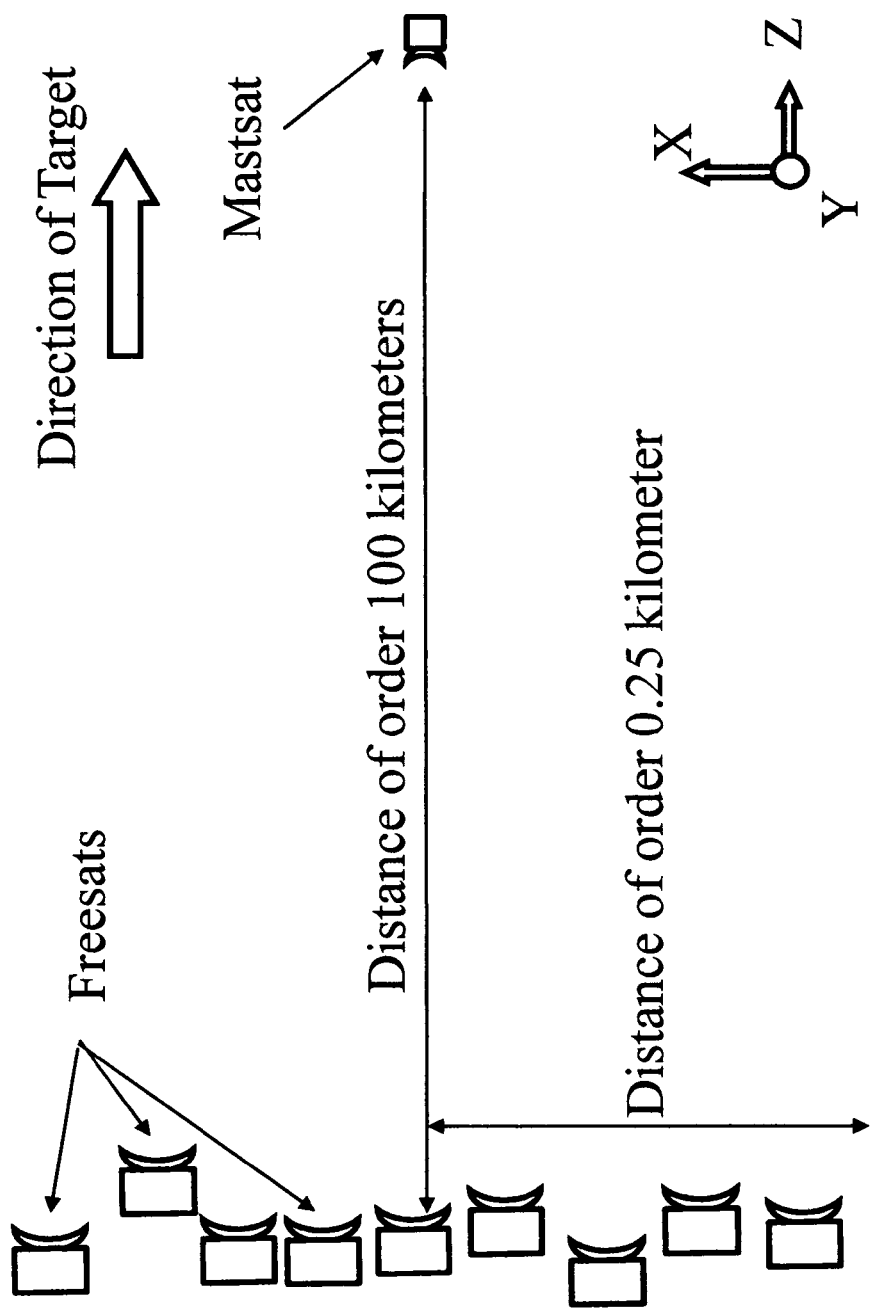
FIG. 5 illustrates a space-based free flying interferometer as one example of the use of the NLI according to the present invention.
Figure 6:
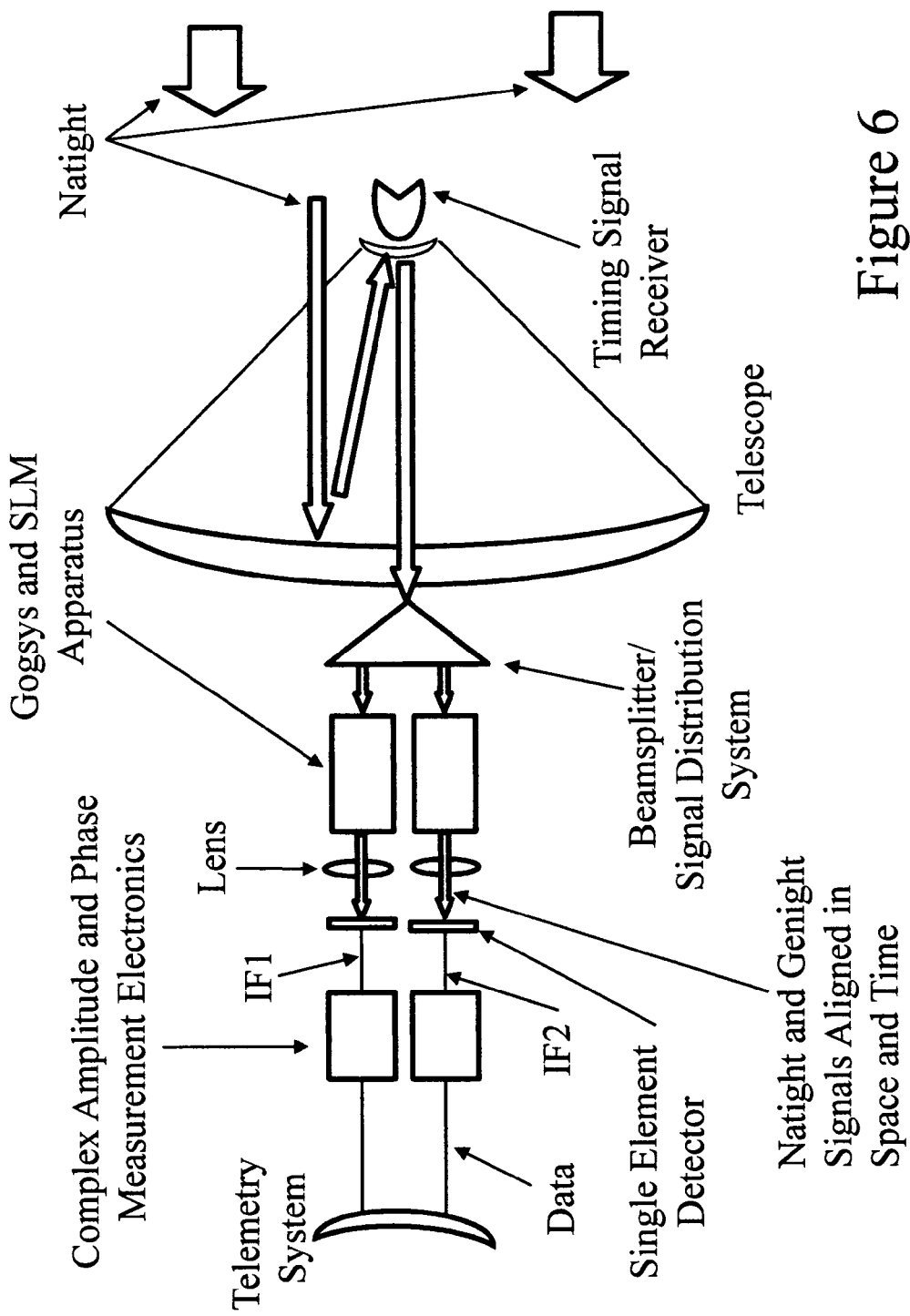
FIG. 6 illustrates a schematic view of the NLI system of a freesat according to the present invention where a two IF NLI system is used to increase the distance before phase ambiguity occurs.
Figure 7:
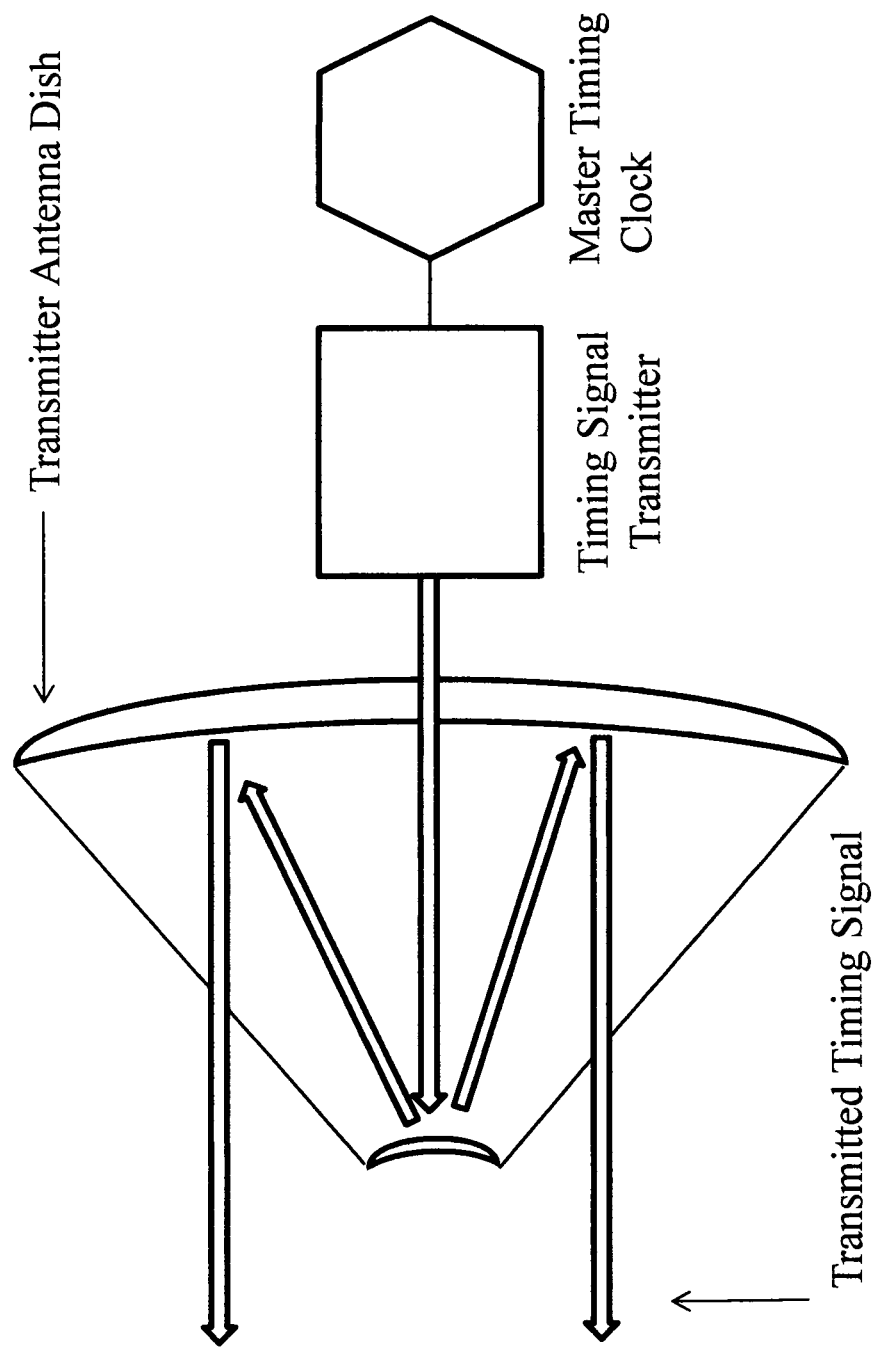
FIG. 7 illustrates a schematic view of the mastsat according to the present invention.

Perhaps the highest use of the Natural Light Interferometer is in the field of space-based interferometry, both astronomical and Earth-observing. The NLI enables a space-based interferometer to operate in direct analogy with ground-based radio astronomy VLBI techniques. One possible embodiment of a space interferometry scheme is shown in FIG. 5. In FIG. 5 an array of freesats is arranged in a pattern advantageous for interferometric observations of the particular target. An NLI is an integral part of each freesat. FIG. 6 illustrates a conceptual design of one possible embodiment of a freesat NLI system that uses two IF frequencies. The amplitude and phase of each observation image (natight) is measured by the NLI. On board atomic clocks provide a time stamp for each observation. Alternatively, a mastsat (FIG. 7) stationed far from the array, in the direction of the target, provides precise and accurate timing to the fleet of freesats comprising the interferometer. The advantage of this type of interferometer is that the station keeping requirements are relaxed from "much less than a wavelength" for traditional interferometers to about a wavelength. Using a second NLI system could relax the station keeping requirements to hundreds of wavelengths and multiple NLIs could extend the requirement to thousands of wavelengths! Knowledge of the exact positions of the freesats is required as in VLBI, but the station-keeping control requirements are relaxed by a factor of many hundreds or thousands! Note that this type of interferometer may be characterized as a sparse array.

A sparse array application of the NLI may include a ground-based surveillance and/or reconnaissance system that comprises a distributed sensor system. With small, dispersed individual interferometers, such a system is robust against detection and the loss of a few individual interferometers. When their data is combined, resolutions rivaling a full aperture interferometer equaling the size of the distributed sensor network may be obtained.

NLI can also be used on space-based tethered and/or rigid interferometers as well as interferometers stationed on planets, minor planets, moons and asteroids.

Space-based assets are valuable, expensive and so their observation time is precious. The number of observations required to interrogate a natight with genight amphats may be reduced using the phase matched filter techniques discussed above. A primary mission for astronomical space-based interferometers is the imaging of planets around distant stars so their atmospheric properties may be analyzed for the tell-tale signs of life. Nulling the signal from the star could be accomplished using appropriate spatpats. Additionally, the sensitivity of the interferometer at the position of the planet in the plane of the sky, both in an angular and azimuthal sense, can be maximized by spatpat choice.

5. How to Use the Invention

The best mode configuration of the present invention illustrated in FIG. 1 can be used in the role of a surreptitious surveillance system where low power operation is vital. An imaging system gathers the natural light signal, corresponding to the scene being watched, and transports this natight to the waveguide of the gogsys. Periodically, the surveillance system powers up the NLI system and the gogsys processes the natight, consuming power in the form of a current across the MQWs. The SLM serially forms the required spatpats, pausing in its cadence so that the detector integrates the signal for a predetermined time. The plane wave genights are impressed with each spatpat by the SLM, creating a non-plane wave amphat, then these genights are optically aligned in space and time with the natight and focused onto the detector. The mixing of the natight and genight amphats generate a complex current output of the detector. Formally this is:

$$\beta e^{i\alpha} = \langle \Phi_{Genight}, \Phi_{Natight} \rangle = \int \Phi_{Natight} \Phi^*_{Genight} dx dy,$$

where $\beta$ is the current amplitude, $\alpha$ is the current phase, $\Phi_{Genight}$ is the amphat of the genight and $\Phi_{Natight}$ is the natight amphat. Moreover, the current is the manifestation of a projection of the genight amphat onto the natight amphat. The current is a measure of the correlation of the two amphats.

This complex amplitude and phase (with respect to an on-board, arbitrary but consistent, phase reference) is measured. After each basis spatpat has been impressed onto a genight and the mixing with the natight measured, all the coefficients are determined.

The coefficients represent the same correlation of the projection:

$$C_{IFm,Gn} = \langle G_n, \Phi_{Natight} \rangle = \beta_{Gn} e^{i\alpha_{Gn}},$$

where $C_{IFm,Gn}$ is the coefficient, IFm is an index for the case of multiple IFs, Gn is the $n^{th}$ genight representing the $n^{th}$ spatpat and the $n^{th}$ basis vector. Remembering that the natight amphat is a summation of the all elements of the basis set ($\Phi_{Gn}$) weighted by their coefficients ($C_{Gn}$). For the single IF case:

$$\Phi_{Natight} = \sum_n C_{Gn} \Phi_{Gn}, \ n = 0, 1, \ldots, n_{max}.$$

Finally, the natight image (intensity distribution) is the magnitude squared of the natight amphat:

$$\text{Intensity} = |\Phi_{Natight}|^2.$$

The image information can be transmitted by the surveillance device in the form of the set of coefficients only, rather than the intensity measurement of every pixel, thereby saving power and reducing the time of transmission, which may be important to avoid detection.

A greater reduction in power use, including less gogsys, detector, SLM, computing and transmitter operation time, is accomplished when one or a few single matched filters can be used to detect a pattern present in the scene under surveillance. With sufficient on-board processing, it is possible that just a "yes" signal may be sent. If the detected coefficient is below a certain threshold, no signal need be sent, thereby saving transmitter power in null cases.

The inventor envisions transforming the present invention into an industrial process in which electronic fabrication and nanotechnology structures are created in a step by step fashion with an NLI interferometry monitoring and controlling the processes. By detection of flaws and incomplete processing, the fabrication can be corrected, thereby increasing yield to near one hundred percent. Also, by defining a reference (in the form of coefficients of a basis set) that represents a "perfect" fabrication process, the NLI-generated coefficients for a particular fabrication run may be compared to the perfect case. In this way the process can be graded as it is progressing.

It will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A Natural Light Interferometer, comprising: an apparatus for generating a facsimile signal (genight) from an incident natight carrying the frequency information of the natight but frequency shifted by a small, constant value, that can be physically separated from the natight; a phase modulation device capable of impressing one of more specific spatpats onto the genight; signal transport optics appropriate to the wavelength regime in which the NLI, wherein the NLI is a natural light interferometer, is operating such as mirrors, lenses and beamsplitters; a single element square law detector appropriate to the wavelength regime in which the NLI is operating in which to mix the natight and genight signals; a complex current measuring device to measure the detector IF, wherein IF is an interference frequency, output; a data storage device; a computer with software or firmware capable of reconstructing the natight amphat using the data generated by the detector and stored on the storage device.

2. A Natural Light Interferometer according to claim 1, wherein the apparatus for genight generation is similar to the gogsys; i.e., MQW, wherein MQW is a multiple quantum well, and NC, wherein NC is a nanocrystal, layers are proximate to the waveguide in which the natight travels.

3. A Natural Light Interferometer according to claim 1, wherein the apparatus for genight generation comprises a MQW layer that is the waveguide in which the natight travels and NC layers are proximate to the MQW/waveguide layer.

4. A Natural Light Interferometer according to claim 1, wherein one or more optical amplifiers are used to boost the natight or genight signals.

5. A Natural Light Interferometer according to claim 1, wherein multiple IFs are created by generating multiple genights; using multiple gogsyses each producing one genight or one large gogsys in which the multiple genights are generated; where the genights are slightly different frequency values from each other; that each genight has a separate signal path for mixing with a portion of the natight in its own detector and having its own current measurement; or each shares the same signal path and the signals are separated out by spectral analysis of the detector current; or each shares the same signal path and the signals are separated out by path length and timing; thereby extending the distance change being measured before phase ambiguity occurs.

6. A Natural Light Interferometer according to claim 1, wherein the present invention is used in the matched filter mode; where one or a few spatpats representing the pattern or patterns of interest are used to impress genights; thereby minimizing the number of measurements used, the power consumed, the calculations performed and the transmission of data required to achieve the mission; including the case in which the NLI transmits a simple "yes" signal to indicate a positive detection of a particular pattern or patterns.

7. A Natural Light Interferometer according to claim 1, wherein the present invention is used in a surveillance or reconnaissance role.

8. A Natural Light Interferometer according to claim 1, wherein the present invention is used in an interferometer role off of planet Earth.

9. A Natural Light Interferometer according to claim 1, wherein the present invention is used in a metrology role.

10. A Natural Light Interferometer according to claim 1, wherein the present invention is used in a sparse interferometer role as part of a distributed sensor network on Earth.

11. A Natural Light Interferometer, comprising: an apparatus for generating a facsimile signal (homight) from an incident natight carrying the frequency information of the natight, not frequency shifted, that can be physically separated from the natight; a phase modulation device capable of impressing one of more specific spatpats onto the homight, including the quadrature phase version of the specific spatpat; signal transport optics appropriate to the wavelength regime in which the NLI, wherein NLI is a natural light interferometer, is operating such as mirrors, lenses and beamsplitters; a single element square law detector appropriate to the wavelength regime in which the NLI is operating in which to mix the natight and homight signals; a current measuring device to measure the detector output; a data storage device; a computer with software or firmware capable of reconstructing the natight amphat using the data generated by the detector and stored on the storage device.

12. A Natural Light Interferometer according to claim 11, wherein the apparatus for homight generation is similar to the hogsys; i.e., a MQW, wherein MQW is a multiple quantum well, layer is proximate to the waveguide in which the natight travels.

13. A Natural Light Interferometer according to claim 11, wherein one or more optical amplifiers are used to boost the natight or homight signals.

14. A Natural Light Interferometer according to claim 11, wherein the present invention is used in the matched filter mode; where one or a few spatpats, and their quadrature phase versions, representing the pattern or patterns of interest are used to impress homights; thereby minimizing the number of measurements used, the power consumed, the calculations performed and the transmission of data required to achieve the mission; including the case in which the NLI transmits a simple "yes" signal to indicate a positive detection of a particular pattern or patterns.

15. A Natural Light Interferometer according to claim 11, wherein the present invention is used in a surveillance or reconnaissance role.

16. A Natural Light Interferometer according to claim 11, wherein the present invention is used in an interferometer role off of planet Earth.

17. A Natural Light Interferometer according to claim 11, wherein the present invention is used in a metrology role.

18. A Natural Light Interferometer according to claim 11, wherein the present invention is used in a sparse interferometer role as part of a distributed sensor network on Earth.

19. A method for using a Natural Light Interferometer comprising the following steps: 1) powering up the gogsys, SLM, wherein an SLM is a spatial light modulator, detector system, current measuring device, storage device and computer; 2) impressing a spatpat onto the SLM that represents the desired genight amphat; 3) introducing a natight into the waveguide of the gogsys; 4) measuring the complex current data from the mixing of the natight and genight signals in the detector; 5) storing the data; 6) repeating steps 2 through 5 until all the basis vectors desired have been applied and their mixing measured; 7) calculating all the coefficients from the data with the computer; 8) reconstructing the natight amphat as a superposition of all the basis vectors, each weighted by their coefficients with the computer; 9) calculating the image (intensity pattern) by taking the magnitude squared of the natight amphat; 10) using the natight amphat and image information for surveillance, reconnaissance, to measure a change in a distance or pattern in metrology, combine with other measurements to generate an image or amphat of an object observed by a sparse array interferometer, detect the change of a pattern from a previous measurement, and/or control a fabrication process.

20. A method for using a Natural Light Interferometer according to claim 19, wherein step 1 becomes: powering up the hogsys, SLM, detector system, current measuring device, storage device and computer; step 2 becomes: impressing a spatpat onto the SLM that represents the desired homight amphat; step 3 becomes: introducing a natight into the waveguide of the hogsys; step 4 becomes: measuring the current from the mixing of the natight and homight signals in the detector; step 6 becomes: repeating steps 2 through 5 with the quadrature phase version of amphat then repeating until all the basis vectors desired and their quadrature versions have been applied and their mixing measured.

\* \* \* \* \*